March 12, 1968    HAN-MIN HUNG    3,373,345
ALTERNATING CURRENT LINE REGULATOR
Filed Feb. 3, 1966    3 Sheets-Sheet 1

INVENTOR.
HAN-MIN HUNG
BY
Alfred W. Barber
ATTORNEY

United States Patent Office 3,373,345
Patented Mar. 12, 1968

3,373,345
ALTERNATING CURRENT LINE REGULATOR
Han-Min Hung, Bayside, N.Y., assignor to Forbro
Design Corp., New York, N.Y., a corporation of
New York
Filed Feb. 3, 1966, Ser. No. 524,804
6 Claims. (Cl. 323—45)

The present invention concerns an automatic alternating current line regulator. In particular, it concerns an application of the reversible shaded-pole motor and a continuous transistorized control circuit to an electromechanical line-corrector, whose regulation is obtained by driving a ganged variable transformer in such a direction that a voltage may be generated across a back-boost transformer to compensate any change of output voltage caused by the change of AC input or of the load current.

The prior techniques of the electromechanical line-corrector could be classified into three kinds. The first kind consists of a servo motor and split-phased control circuit using either silicon controlled rectifiers or thyratrons. The difference between firing angles of SCR or thyratron in two phases determines the direction of rotation of the motor, which drives a variable transformer to produce a voltage across the buck-boost transformer compensating the line change. The second kind uses a relay switching circuit in addition to either a shaded-pole motor or a DC motor. The relay control circuit switches the polarity of the field winding of motor in order to change the direction of rotation. And the third kind consists of a continuously running motor and two magnetic clutches, one of which turns the variable transformer in the clockwise direction and the other in the counterclockwise direction. The control circuit will be operated to energize one of these two clutches to achieve the regulation.

The present invention of using the reversible shaded-pole motor and a continuous transistorized control circuit as an electromechanical line-corrector is an improvement over the prior art. It has been found advantageous to use a reversible shaded-pole motor rather than a true servo motor because the cost of the former is much lower than the latter and the size of the former is also smaller than the latter for the same rating of the speed and torque. The continuous transistorized control circuit is also superior to the conventional relay switching circuit because the latter only provides an on-off type control so that the system may hunt indefinite around the equilibrium position due to the overshoot. This hunting, however, is minimized in the system in accordance with the present invention. At the point of equilibrium, this continuous transistorized control circuit will keep currents flowing through both shading coils of the motor simultaneously, hence a dynamic brake results providing a stabilized positioning control of the motor-driven variable transformer. It has also been found advantageous to use ganged variable transformers rather than a center-tapped variable transformer because the former doubles the capacity of the line regulator and also doubles the rate of voltage correction without deteriorating the resolution of the system, which is determined by the voltage per turn of the variable transformer.

Accordingly one object of the present invention is to provide a less expensive and smaller AC line corrector with fast correction rate for a given power output than has hitherto been available.

Another object is to utilize a shaded-pole motor driving an auto-transformer in an AC line voltage corrector.

A further object is to control a shaded-pole motor driving an auto-transformer in an AC line voltage correction in a circuit which provides great stability due to means which cause current to flow in both shading coils at the same time and so to provide dynamic braking.

These and other objects will be apparent from the detailed description of the invention given in connection with the various figures of the drawing.

Figure 1:
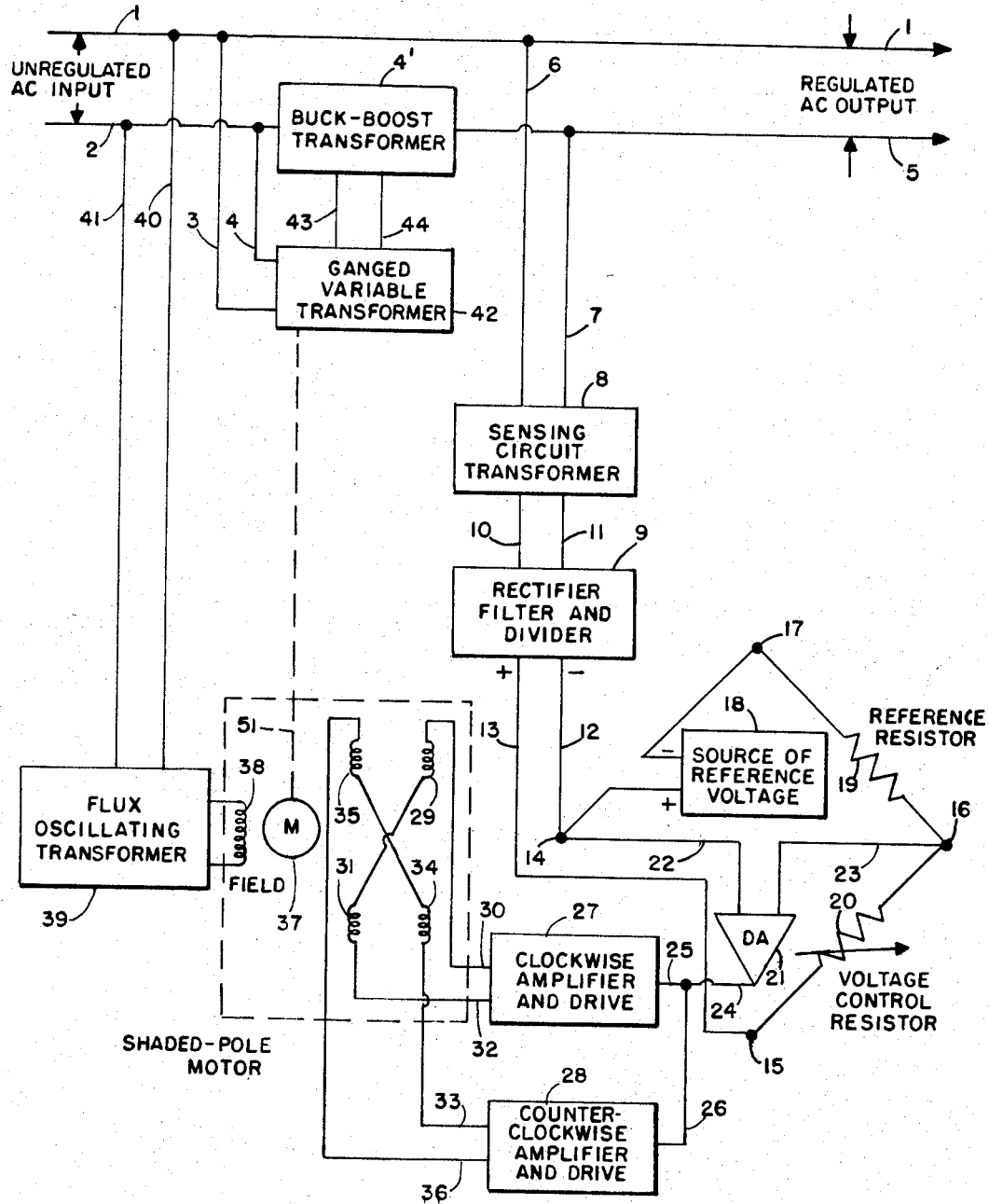
FIG. 1 is a circuit diagram partly in block form of one form of the present invention.

FIG. 1 shows unregulated AC input to be regulated applied across lines 1 and 2 and the regulated output on lines 1 and 5 where output line 1 is a continuation of input line 1 and 5 receives current from line 2 through the buck-boost transformer 4'. The output voltage across lines 1 and 5 is applied to a sensing circuit transformer 8 over connecting lines 6 and 7. This transformer 8 is connected to rectifier, filter and divider 9 over connecting lines 10 and 11. The DC thus produced (details given below) is a function of the output voltage and is applied over connecting lines 12 (negative) and 13 (positive) to terminals 14 and 15 respectively of the comparison bridge having terminals 14, 15, 16 and 17. Between terminals 14 and 17 is connected a source of reference voltage 18 with its negative terminal going to terminal 17 and its positive terminal going to terminal 14. Between terminals 16 and 17 is connected a reference resistor 19 having a value which when divided into the value of the reference voltage yields a predetermined bridge current, for example 1 milliampere. Between terminals 15 and 16 is connected a variable voltage control resistor 20 which has a range of value from a suitable minimum value to a maximum value which latter is such as to be equal to the maximum rectified voltage from divider 9 when multiplied by the bridge current. As example, if the reference voltage 18 is 6 volts, reference resistor 19 will be chosen as 6000 ohms and if the maximum voltage required from divider 9 is 10 volts, the maximum value of control resistor 20 will be 10,000 ohms. When this bridge is balanced, i.e. when the reference voltage divided by the reference resistor equals the divider output voltage divided by the resistance of the control resistor, substantially no voltage appears across bridge terminals 14 and 16 to be applied to amplifier 21 over leads 22 and 23 respectively. When this balance exists and no signal is applied to amplifier 21, the system is producing the required output voltage and no corrective action is called for.

When the bridge is not balanced, a resultant (error) signal is applied to the input of amplifier 21 (details given below) and a differential amplified output signal appears on line 24 the polarity of which depends on whether the output on lines 1 and 5 is above or below the desired regulated output. This differential output is applied over lines 25 and 26 to the two motor drive amplifiers 27 and 28. Amplifier 27 is connected to motor windings 29 and 31 over lines 30 and 32, the energizing of which drives motor 37 in a clockwise direction and amplifier 28 is connected to motor windings 34 and 35 over lines 33 and 36, the energizing of which drives motor 37 in a counter-clockwise direction. Motor 37 is a shaded pole motor and is provided by a regulated excitation of its field 38 from a flux oscillating regulating transformer 39 connected to input lines 1 and 2 over connecting lines 40 and 41. Error signals from the bridge amplified by amplifier 21 and amplifier drivers 27 and 28 drive motor 37 in a clockwise or counter-clockwise direction in accordance with the polarity of the error signal and the output of amplifier 21. Motor 37 is mechanically coupled to a pair of ganged variable auto-transformers 42 over mechanical linkage 51. Transformers 42 receive AC power from lines 1 and 2 over connecting lines 3 and 4. The differential output of transformers 42 (details given below) goes to buck-boost transformer 4' over lines 43 and 44. This latter transformer 4' when energized by a differential AC signal from transformers 42 provides AC voltage in phase or out of phase so as to supply the proper balance voltage between the line 2 of the AC source and the line 5 of the regulated output. The phasing of the system both electrically and mechanically so that the buck-boost voltage from transformer 4' tends to correct the output voltage on lines 1 and 5 to restore it to a predetermined value. In other words to increase the output when the input or load tends to decrease the output and vice versa. Detailed descriptions of various portions of the circuit are given below in connection with FIGS. 2, 3 and 4.

Figure 2:
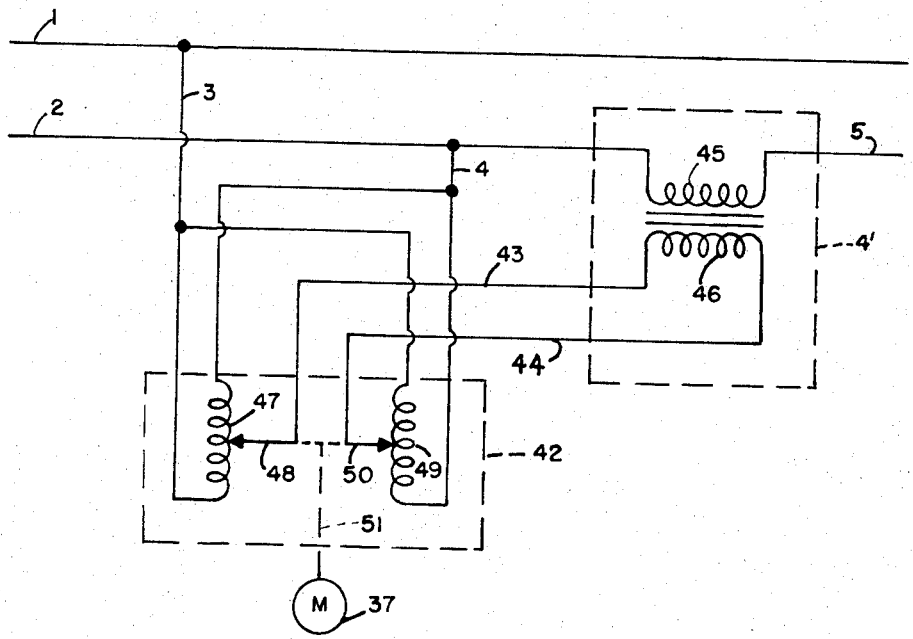
FIG. 2 is a circuit diagram of one form of motor driven auto-transformer and buck-boost transformer used in connection with the present invention.

FIG. 2 shows circuit details of the ganged variable transformer 42 and the buck-boost transformer 4'. The ganged variable transformer 42 includes windings 47 and 49 with variable contacts 48 and 50 respectively. These variable contacts 48 and 50 are driven along their respective coils by motor 37 connected over a suitable mechanical linkage 51. Contacts 48 and 50 are connected to opposite ends of primary 46 of buck-boost transformer 4' over leads 43 and 44. Secondary 45 is connected in series with the power circuit between incoming line 2 and outgoing line 5. Winding 47 is bridged across the incoming lines 1 and 2 and winding 49 is oppositely connected across these same lines so that when variable contacts 48 and 50 are at one end of their travel, a maximum voltage is placed across primary 46 and when at the other end, a maximum voltage of opposite polarity is placed across primary 46. Thus, full correction voltage appears across secondary 45 in one phase at one end of the variable contact travel and of the opposite phase at the other end. The correction voltage will be seen to pass through zero near the center of the travel of contacts 48 and 50 along windings 47 and 49. The various windings are poled in such a manner as to provide a boost in voltage across lines 1 and 5 in response to a drop caused, for example, by an increased load or a decrease in input line voltage operating through the control mechanism and resulting in rotation of motor 37. Similarly a bucking voltage is provided across winding 45 in response to a tendency for the voltage across lines 1 and 5 to rise.

Figure 3:
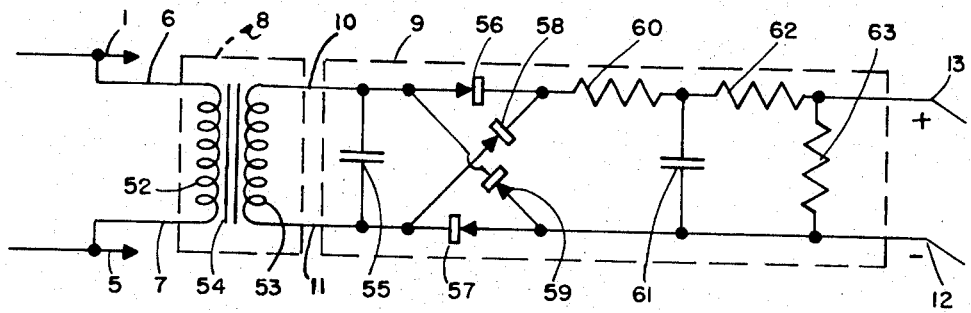
FIG. 3 is a circuit diagram of one form of sensing transformer, rectifier, filter and divider used in connection with the present invention.

FIG. 3 shows circuit details of the sensing circuit transformer 8 and the rectifier filter and divider 9. The sensing circuit transformer 8 consists of a suitable transformer including a primary 52, secondary 53 and core 54. Primary 52 is connected across the regulated AC output lines 1 and 5 by means of leads 6 and 7 respectively. The AC voltage across secondary 53 is applied to a rectifier bridge circuit made up of rectifiers 56, 57, 58 and 59 to provide a DC voltage which is proportional to the AC voltage across lines 1 and 5. This DC voltage is filtered and smoothed by an R-C filter including series resistor 60 and shunt capacitor 61 selected to provide a predetermined response time. Capacitor 55 is connected across secondary 53 to suppress noise and sharp voltage spikes which may appear across lines 1 and 5. A suitable portion of the DC voltage across capacitor 61 is selected by a voltage divider made up of series resistor 62 and shunt resistor 63 and the resulting DC signal for application to the control bridge appears across output lines 12 and 13 (see FIG. 1 also).

Figure 4:
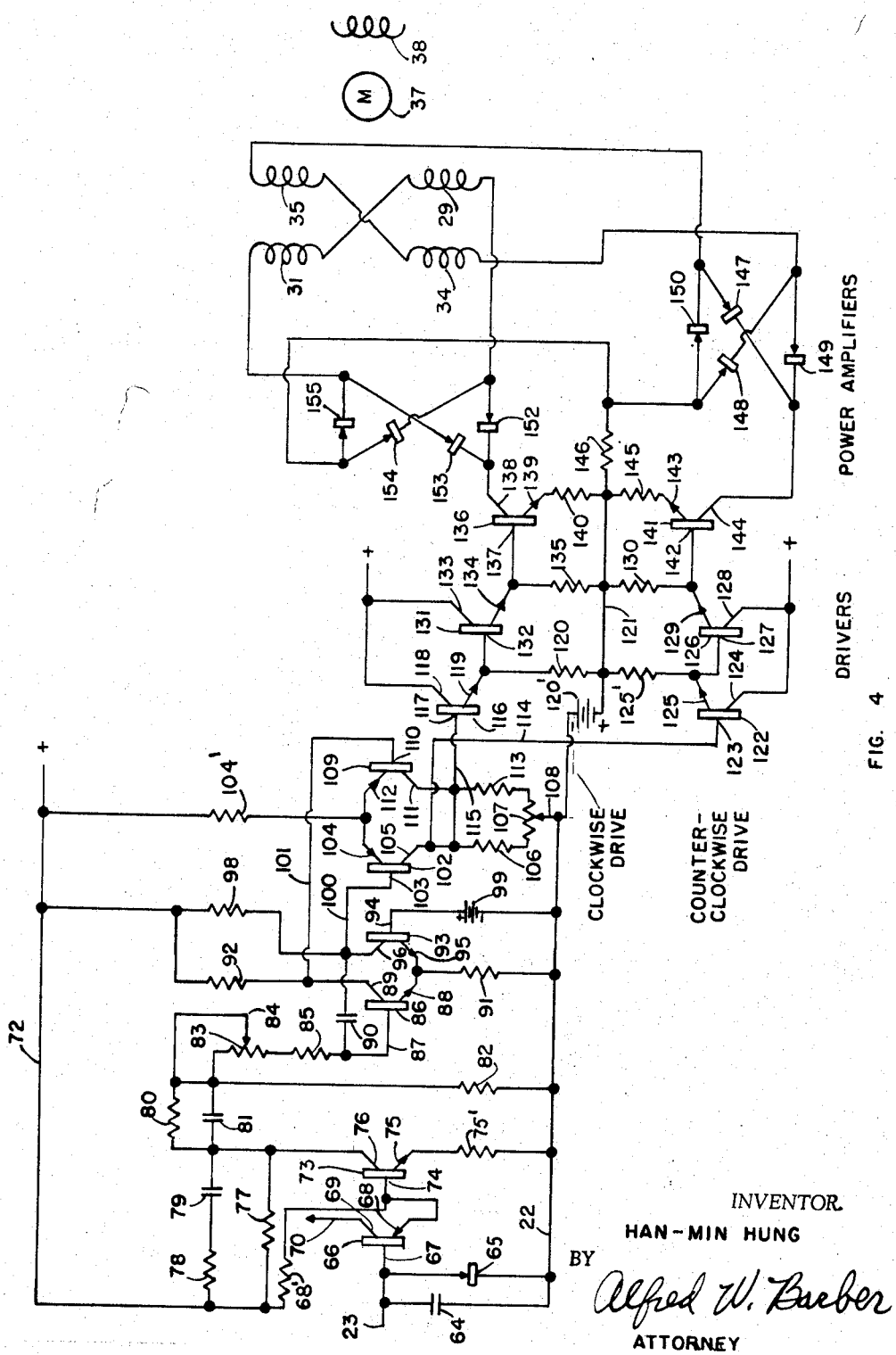
FIG. 4 is a circuit diagram of one form of DC amplifier, controlled multi-vibrator, differential amplifier, drivers and power amplifiers used in connection with the present invention.

FIG. 4 shows circuit details of amplifier 21, the difference or error amplifier which may be taken to include a controlled multi-vibrator and differential amplifier, clockwise amplifier and drive 27, counter-clockwise amplifier and drive 28 and the shaded-pole motor 37 together with its various windings. The error signal developed in the bridge appears across terminals 14 and 16 (FIG. 1) and is applied to the DC amplifier utilizing transistors 66 and 73 over leads 23 and 22. The first transistor stage consists of transistor 66 including base 67 receiving the input signal over lead 23, collector 69 connected to a source of stable negative bias such as the negative terminal of the reference voltage over lead 70, and emitter 68 connected to base 74 of the second transistor 73 and to positive line 72 through emitter resistor 68'. Capacitor 64 is connected from base 67 to common line 22 to filter out noise or sharp transient voltages at the input to the amplifier. Also, rectifier 65 is connected between base 67 and common line 22 to prevent base 67 from going positive. The second stage transistor 73 includes base 74, emitter 75 and collector 76. Collector 76 is connected to positive line 72 through load resistor 77 and emitter 75 is connected to common line 22 through emitter resistor 75'. A suitable lag network consisting of resistor 78 in series with capacitor 79 is connected across load resistor 77 to establish the closed loop feedback amplifier. The error signal amplified by transistors 66 and 73 is applied to a divider consisting of resistor 80 in series with resistor 82. Capacitor 81 across resistor 80 provides a leading current to resistor 82 so that sudden changes in error signal are accentuated across resistor 82.

The following two transistors 86 and 93 are connected to form a controlled multivibrator i.e. one which is controlled by an input signal. This signal originates in the error amplifier described above. Describing the controlled multivibrator circuit, transistor 86 has a base 87, emitter 88 and collector 89 while transistor 93 has a base 94, emitter 95 and collector 86. Emitters 88 and 95 are connected to the common line 22 through common emitter resistor 91. Collector 89 is connected to the positive voltage line 72 through load resistor 92 and collector 96 is connected to this same line through load resistor 98. A feedback coupling from collector 96 to base 87 is provided by capacitor 90. Base 94 is connected to a reference bias source as, for example, battery 99. The amplified error voltage appearing across resistor 82 is applied to base 87 through resistor 83 which is varied by adjustable contact 84 and fixed resistor 85. The frequency of oscillation of this multivibrator circuit is determined by its circuit constants but its duty cycle i.e. its dwell time on positive or negative pulses is controlled by the amplitude of the amplified error voltage applied to base 87. Variation of contact 84 acts as a sensitivity control for the system and as such has a control over hunting.

The next two transistors 102 and 109 are connected to act as a differential amplifier of the pulses from the multivibrator. Transistor 102 has a base 103, an emitter 104 and a collector 105 while transistor 109 has a base 110, an emitter 112 and a collector 111. Emitters 104 and 112 are returned to the positive voltage line 72 through the common emitter resistor 104'. Collector 105 is connected to one end of balance potentiometer 107 through load resistor 106 and collector 111 is connected to the other end through load resistor 113. The contact 108 of balance potentiometer 107 is connected to common line 22. The output of the multivibrator is applied to this differential amplifier over leads 100 and 101 with which collector 96 is connected to base 103 and collector 89 is connected to base 110 respectively. When the duty cycle of the multivibrator is 50–50, positive and negative pulses of equal duration are applied to these bases of the differential amplifier and amplified equal duration pulses appear at collectors 105 and 111. These pulses are amplified by the clockwise drive and the counter-clockwise drive amplifiers to be described below and when equal exert equal pull on the motor 37 through the coils 29–31 and 34–35.

The clockwise drive amplifier includes drive transistors 116 and 131 and power amplifier transistor 136. Transistor 116 has a base 117, emitter 119 and collector 118. Base 117 is connected to collector 111 of differential amplifier transistor 109 over lead 115 so that it receives amplified multivibrator pulses. Emitter 119 is returned to common lead 121 through emitter resistor 120 and collector 118 is connected to a suitable source of positive bias, not shown. The common lead 121 is returned to lead 22 through another suitable positive bias source as, for example, battery 120'. Transistor 131 receives pulses from transistor 116 through the connection of base 132 to emitter 119. Emitter 134 is returned to common lead 121 through emitter resistor 135 and collector 133 is connected to the source of positive bias mentioned above. Power transistor 136 has a base 137, an emitter 139 and a collector 138. Amplified pulses from emitter 134 are applied to base 137. Emitter 139 is returned to common lead through emitter resistor 140. The amplified power pulses at collector 138 supply shunting action to clockwise motor drive coils 29 and 31 through a full wave rectifier made up of rectifiers 152, 153, 154 and 155. This coupling permits the unidirectional transistor 136 to load the AC drive in coils 29 and 31 causing the motor 37 to rotate in the clockwise direction.

The counter-clockwise drive amplifier is similar to the clockwise drive amplifier described above but utilizing transistors 122, 126 and 141. Transistor 122 has a base 123 receiving pulses from emitter 105 of differential amplifier transistor 102 over line 114. Emitter 125 is returned to common line 121 through emitter resistor 125'. Collector 124 is connected to a suitable source of positive bias, not shown. Base 127 of transistor 126 receives amplified pulses from transistor 122 over its connection to emitter 125. Emitter 129 is returned to common line 121 through emitter resistor 130 and collector 128 is connected to the same positive bias source as is collector 124. The power driving transistor 141 receives amplified pulses through the connection of its base 142 to emitter 129. Emitter 143 is returned to common line 121 through emitter resistor 145. Collector 144 is connected through the full wave rectifier made up of rectifiers 147, 148, 149 and 150 and counter-clockwise motor drive coils 34 and 35 to a suitable source of positive polarity power, not shown. The functioning of transistor 141 is similar to that described for transistor 136 above. When transistor 141 is pulsed, the AC voltage generated in counter-clockwise coils 34 and 35 is rectified by rectifiers 147, 148, 149 and 150 so that unidirectionally conducting transistor 141 exerts an effective shunting effect on coils 34 and 35 causing motor 37 to turn in the counter-clockwise direction. Resistor 146 is the common current limiting resistor for both transistors 136 and 141. One end of resistor 146 is connected to the common line 121, and the other end is connected to anodes of rectifiers 148, 150, 154 and 155.

When no error signal is being generated in the comparison bridge, equal pulses are produced by the controlled multivibrator and equal shunting is provided by transistors 136 and 141 on the clockwise and counter-clockwise coils of the motor. When in this condition, since equal torque is exerted in both directions, the motor stands still. Now if an error signal is generated in the comparison bridge, the resulting signal applied to the controlled multivibrator causes it to change its duty cycle so that one of its output pulses is longer than the other in duration and after going through the various amplifiers described above these pulses cause the time of conduction of one of transistors 136 and 141 to be longer than the other and in turn to shunt either the clockwise or the counter-clockwise coils longer than the other which causes motor 37 to rotate in the direction determined by the longer pulse. The phasing in the system is such that this rotation of motor 37 is in a direction to tend to reduce the error signal generated in the comparison bridge. The differential action provided on the motor as described above provides automatic braking so that the system stability is of a high order. Contact 84 is moved on resistor 83 affecting the sensitivity of the controlled multivibrator whose DC bias level is affected since resistor 83 is in series with base 87 of transistor 86. The gain of the system can thus be adjusted to some suitable operating point. If the gain is too high there will be excessive hunting and if too low, the system will not provide accurate correction.

While only one form of the present invention has been shown and described, many modifications will be apparent to those skilled in the art and within the spirit and scope of the invention as set forth in particular in the appended claims.

What is claimed is:

1. In an alternating current line voltage regulating system the combination of, input terminals for receiving alternating current to be regulated, output terminals to transmit regulated alternating current, a buck-boost transformer connected in series between one of said input terminals and one of said output terminals for increasing or decreasing the alternating current voltage between said input and output terminals, programmable variable transformer means connected to said input terminals and said buck-boost transformer for providing input voltage to said buck-boost transformer, a shaded pole reversible induction motor including a field winding, clockwise drive shading coils and counterclockwise drive shading coils, mechanical coupling means between said motor and said variable transformer to program said variable transfomer in accordance with the rotation of said motor, means for exciting said field, means for sensing the voltage across said output terminals, means for rectifying said sensed voltage to provide a direct current voltage representative of said sensed voltage, means for comparing said direct current voltage with a reference voltage to provide an error signal of a polarity and magnitude in accordance with the difference therebetween, means for amplifying said error signal to provide an enhanced error signal, signal responsive means for energizing said clockwise drive shading coils, signal responsive means for energizing said counterclockwise drive shading coils, and coupling means for applying said enhanced error signal to the last two said signal responsive means to provide rotation of said motor in accordance with the polarity and magnitude of said error signal.

2. An alternating current line voltage regulating system in accordance with claim 1 wherein said reference voltage comprises the voltage drop across a variable resistor carrying a predetermined current.

3. An alternating current line voltage regulating system in accordance with claim 1 wherein said means for exciting said field comprises a flux oscillating voltage regulating transformer.

4. An alternating current line voltage regulating system in accordance with claim 1 wherein both of said means for energizing said shading coils comprise transistor power amplifiers.

5. An alternating current line voltage regulating system in accordance with claim 1 wherein both of said means for energizing said shading coils include power transistors and rectifiers connected between said power transistors and said shading coils for switching the unidirectional conduction of said transistors.

6. An alternating current line voltage regulating system in accordance with claim 1 and including means for providing substantially equal and opposite excitation of said shading coils in the presence of a substantially zero value of said error signal to dynamically brake said motor.

References Cited

UNITED STATES PATENTS

| | | | |
|---|---|---|---|
| 2,619,630 | 11/1952 | Stone | 323—45 |
| 2,966,626 | 12/1960 | Kalina et al. | 323—45 |
| 3,068,395 | 12/1962 | Perrins | 323—45 |
| 3,281,654 | 10/1966 | Reinert | 323—45 |

JOHN F. COUCH, *Primary Examiner.*

WARREN E. RAY, *Examiner.*